Figure 1:
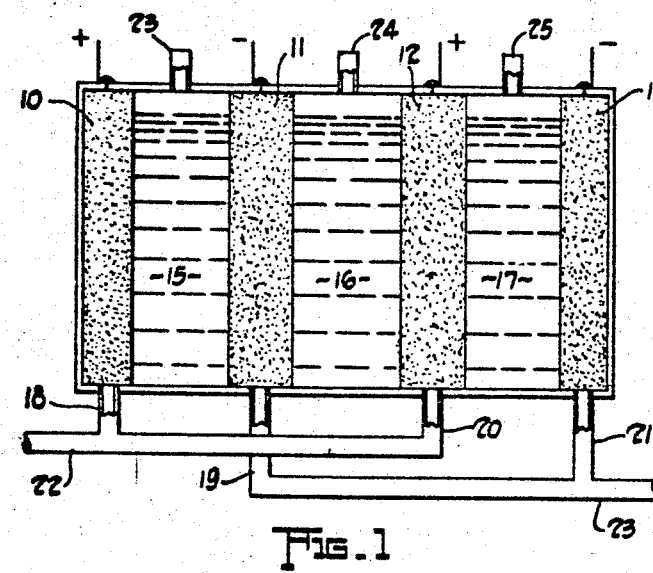

April 6, 1965          D. L. BEALS          3,177,097

ELECTROCHEMICAL REACTION APPARATUS

Filed Sept. 29, 1960

INVENTOR.
DAVID L. BEALS

BY Schramm, ...... & Sturges

ATTORNEYS.

United States Patent Office 3,177,097
Patented Apr. 6, 1965

3,177,097
ELECTROCHEMICAL REACTION APPARATUS
David L. Beals, Newbury, Ohio, assignor to The Standard Oil Company, Cleveland, Ohio, a corporation of Ohio
Filed Sept. 29, 1960, Ser. No. 59,373
4 Claims. (Cl. 136—86)

This invention relates to the direct conversion of one form of energy to another, and more particularly relates to an apparatus for accomplishing such conversion electrochemically in an assembly of plural unit converters which share operative components in a manner to simplify the overall construction and improve the efficiency of operation. For exemplary purposes, the principle of this invention will be described in reference to a fuel cell for directly converting the chemical energy of controlled combustion into electrical energy; it being understood however, that their principles are equally applicable to other types of electrochemical reaction apparatus for accomplishing the same results.

The direct conversion of chemical energy into electrical energy is accomplished by causing chemical reactions to take place between electrochemically reactive materials at the junctures between spaced electron conductors and an intermediately disposed ion-containing and conducting medium to form a continuous energy exchange system. The reactive materials are separately supplied to each juncture so that the charge exchange of the reaction takes place ionically through the ion-conductor forming an internal circuit, and electronically through the electron conductor forming an external circuit. Thus, where the reactive materials are continuously supplied and an electrical load is coupled to the external circuit, it is possible to electrochemically convert the energy of chemical reaction directly into electrical energy in the external circuit.

By way of example, where hydrogen is employed as one of the materials, and oxygen as the other the oxidation and reduction, respectively, of each of these materials at the corresponding juncture between the electronic and ionic conductors generates electrical energy in the external circuit and produces water as a by-product of the reaction. When each of the materials is continuously supplied and consumed within such an apparatus, it may be likened respectively, to a fuel and to an antifuel, the former of which is selected to yield electrons in its chemical reaction, and the latter of which is selected to accept electrons.

Normally, in any such apparatus, the fuel and antifuel are supplied in a relatively stable condition and some means is required for activating their conversion from the normally stable reactant state to their reaction product state. It is believed that such conversion of the fuel and antifuel takes place by means of chemical adsorption to a chemisorbed state and desorption to the reaction product state at the corresponding junctures between the electron and ion conductors. Such conversion of the fuel and antifuel is not practically self-motivating and is, therefore, preferably enhanced by the introduction of some means which will promote adsorption at each juncture and some ionic means in the ion-conducting medium which will promote desorption at each juncture. The reaction products may be removed from the apparatus in any convenient manner and preferably as they are formed.

For the purpose of description of an illustrative reaction apparatus, a fuel cell for accomplishing the direct conversion of chemical energy to electrical energy will be used. The electron-conductors will be identified as electrodes, and more specifically, as the anode and cathode, respectively depending upon whether they are on the fuel or antifuel side of the cell. The fuel will be identified throughout as any hydrogen-containing substance which is oxidizable relative to the antifuel which will, in turn, be identified as any substance which is reducible relative to the fuel. Oxidation and reduction, respectively, contemplate the release and acceptance of electrons. The ion conductor will be identified throughout as any medium which is capable of conducting an electrical charge associated with an atom or a group of atoms, i.e., ions, and which, therefore, electronically isolates the electronic conductors from each other in the internal circuit. The junctures between the electrodes and the ion conductor will be identified throughout as interfaces. The activating means for promoting the conversion of the fuel and antifuel from their reactant state through the chemisorbed state to the reaction product state will be more specifically identified in conjunction with their functional coaction in the cell and as an adsorber and desorber. The overall reaction of the cell will be referred to as an electrochemical reaction.

A plurality of electrochemical reaction units or cells of the type heretofore described may be assembled in juxtaposed or stacked relation to provide a multi-cell apparatus with increased electrical output. The individual units of such an assembly may thus be connected in series or parallel across a suitable electrical load. However, an assembly of this type becomes unduly cumbersome and complex to the extent that the individual components of each unit or cell are duplicated and a principal objective of this invention is to simplify and increase the overall efficiency and economy of such an assembly.

Briefly stated, this invention contemplates the utilization of electrodes which are common to adjacent units or cells thereby providing an integral assembly of electrochemical reaction units which share common electrodes exposed to a common supply of the corresponding reactant; alternate electrodes being exposed to a relatively reducible reactant and intermediate electrodes being exposed to a relatively oxidizable reactant to provide electrodes of alternating polarity across the assembly. With such an arrangement the corresponding reactants can be supplied from suitably manifolded ducts and the overall assembly constructed in integral compact arrangement with a minimum of external ducts or connections.

Figure 2:
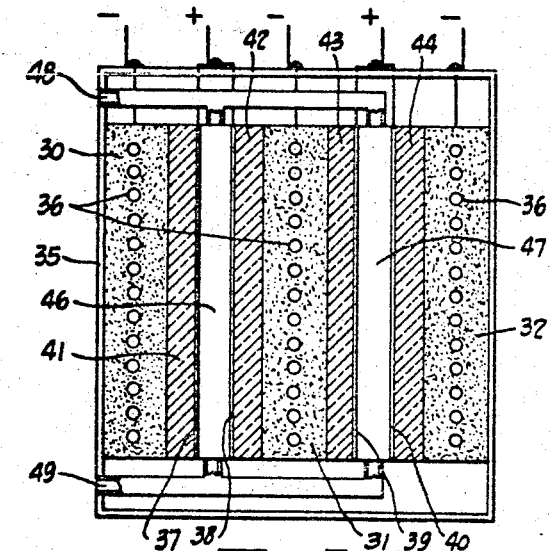

In the drawings:
FIGURE 1 is a diagrammatic and schematic illustration of a plurality of electrochemical reaction cells assembled in accordance with this invention, and;
FIGURE 2 is a diagrammatic and schematic illustration of another embodiment of electrochemical reaction cells assembled in accordance with this invention.

Referring now particularly to FIG. 1 of the drawings, there is diagrammatically shown an electrochemical reaction apparatus in the exemplary form of a multiple fuel cell having a plurality of electrodes 10, 11, 12 and 13 disposed in juxtaposed spaced relation to each other. In the preferred exemplary embodiment illustrated, the electrodes are constructed of porous electron conducting material such as carbon or graphite which by suitable means not forming part of this invention has been provided with a porous matrix structure designed to receive and permit optimum diffusion of a gaseous reactant therethrough. The spaces between the electrodes are occupied by suitable ion conducting and transfer mediums 15, 16 and 17, respectively, for coaction in the manner hereinbefore described. In the exemplary embodiment shown, the ion conducting and transfer mediums are aqueous solutions having an activator such as a water-soluble acid, salt or base dissolved therein to motivate the desorption of the chemisorbed reactants at the respective interfaces as hereinbefore described. In an actual apparatus, the electrodes may be rectangular in configuration with sides measuring approximately 12 inches and approximately $\frac{1}{16}$ of an inch thick. The space between the electrodes may be on the order of 1/10 inch. In addition, the electrodes are preferably coated with a material, such as silicone, to render them hydrophobic to the aqueous ion containing and transfer medium.

The gaseous fuel is supplied to alternate electrodes 10 and 12 by means of supply ducts 18 and 20, respectively, each of which are in turn coupled to a common supply duct 22 forming a simple manifolded arrangement which requires only one external connection. A similar manifolded arrangement is provided for supplying gaseous antifuel to electrodes 11 and 13 through ducts 19, 21 and 23. The antifuel may be an oxygen-containing gas, such as, air, and the fuel may be a hydrogen-containing gas which may be an admixture or a chemically combined hydrocarbon such as ethane. In the latter case, a suitable dehydrogenation catalyst, such as palladium or nickel, may be employed to separate the hydrogen from the hydrocarbon for adsorption at the porous electrode interfaces. The fuel and anti-fuel are preferably supplied at pressures sufficient to maintain optimum concentrations within the corresponding porous electrode matrix in relation to the rates of adsorption and desorption at the corresponding interfaces.

The entire assembly may be enclosed by any suitable housing 26 or body not forming part of this invention and therefore not fully shown which housing may be constructed from non-conducting materials, e.g. plastic or glass, that are impervious to gases and liquids. Suitable electrical leads designated in FIG. 1 by signs of electrical polarity are connected to each of the electrodes and may be coupled in series or parallel across a suitable electrical load as hereinbefore described.

In operation, the fuel and antifuel are highly reactive with each other and the ion-containing transfer mediums coact to prevent spontaneous interaction that would normally be productive of energy forms other than useful electricity. The controlled reactions take place at the interfaces within the porous electrodes in a multi-phase reaction characteristic of fuel cells utilizing gaseous reactant materials. In addition to electrical energy, the product of these controlled reactions is water which must be exhausted during operation. In the preferred embodiment shown, it is contemplated that the water product will be exhausted as vapor through the exhaust ducts 23, 24 and 25. If the water product is formed at a rate in excess of that which can be readily exhausted as vapor, suitable drains may be provided in the base of the enclosing housing to supplement the exhaust ducts 23, 24 and 25.

Referring now to FIG. 2 of the drawings, there is diagrammatically and schematically illustrated another embodiment of a compact assembly of fuel cell units employing the common electrode features of this invention. The assembly includes a plurality of porous graphite electrodes 30, 31 and 32 supported in spaced juxtaposed relation within any suitable external housing 35. These porous graphite electrodes are provided with passages which are diagrammatically represented in FIG. 2 of the drawings by openings 36 which are adapted to receive a gaseous antifuel such as air. The fuel electrodes are preferably in the form of palladium sheets 37, 38, 39 and 40 which are supported on porous ceramic members 41, 42, 43 and 44. The latter are saturated with an aqueous basic material to provide the necessary ion containing and transfer mediums which electrochemically coact with the fuel and antifuel reactants at the adjacent electrode interfaces respectively to generate electrical energy in the manner hereinbefore described.

Since the porous ceramic members 41, 42, 43 and 44 act as supporting substrates for the palladium sheets 37, 38, 39 and 40, the latter are preferably spaced from each other to form passages 46 and 47 through which the gaseous fuel may be supplied. The fuel is preferably supplied through a common manifolded duct 48 which communicates directly with the passages 46 and 47. Another manifolded duct 49 communicates directly with the lower extremities of the passages 46 and 47 and of the supporting ceramic members 41, 42, 43 and 44 to exhaust unreacted fuel and products of reaction from the assembly. Similar manifolding means, not shown, may be coupled to one side of the antifuel electrode passages 36 to supply and circulate air therethrough with another manifold connected to the other side of said passages 36 for purposes of exhaust.

The assembly of FIG. 2 is adapted to operate at all temperatures extending over a considerable range, e.g. from room temperature to 300° C. When the cell assembly is operated at a temperature above the normal boiling point of the aqueous ion-containing and transfer mediums, the cell should be able to withstand the operation under pressure. The porous ceramic substrate for the electrodes serves this purpose satisfactorily. When the fuel is a hydrocarbon, the cell may be operated at a somewhat elevated temperature by mixing the fuel with water. Such a fuel mixture will undergo a water gas shift reaction in the environment of the palladium fuel electrodes. Continuous supply of this fuel mixture will remove the carbon dioxide, while the hydrogen is selectively passed through the palladium fuel electrodes for reaction at the corresponding interface. Thus, the palladium fuel electrodes serve the added purposes of catalyzing dehydrogenation of the hydrocarbon fuel and providing a barrier to isolate the fuel from the antifuel. Similarly, the oxygen-containing antifuel will pass through the pores of the porous graphite antifuel electrodes for reaction at that interface.

When assembled, the fuel and antifuel electrodes may be electrically coupled in series or parallel relation to a suitable electrical load; the schematic illustration of FIG. 2 showing the electrodes of the individual cell units coupled in parallel relation. The housing 35 may, of course, be constructed in any convenient design employing suitable non-conducting materials that are impervious to gases or liquids. Any number of cell units may be stacked or assembled into a compact integral generator which can be adapted and controlled to accommodate any type electrical load.

Thus, there has been provided an electrochemical reaction apparatus in the form of an assembly of plural cell units where the cell units share common electrodes in a manner which simplifies the structure and increases the economy and efficiency of operation.

Other modes of applying the principle of this invention may be employed instead of those specifically set forth above, changes being made as regards the details herein disclosed provided the elements set forth in any of the following claims, or the equivalent of such be employed.

It is, therefore particularly pointed out and distinctly claimed as the invention:

1. An electrochemical reaction apparatus comprising in combination a plurality of hydrogen permeable electron conducting palladium sheets disposed in juxtaposed spaced relation, non-conducting porous matrices disposed in the spaces between said electron conducting palladium sheets, an intermediate electron conducting member being a porous member and coacting with the porous matrix at each side to form independent interfaces with each, respectively, the next adjacent electron conducting palladium sheet on each side of said porous electron conducting member each forming an independent reaction interface with the corresponding porous matrix, respectively, means for supplying hydrogen to the reaction interfaces between each of said next adjacent electron conducting palladium sheets and the corresponding porous matrix, means for supplying and maintaining an aqueous ion-containing and conducting medium in each porous matrix, means for supplying and distributing a gaseous coreactant for hydrogen through the intermediate porous electron conducting member, and means for connecting the porous intermediate electron conducting member to one pole of an electrical circuit and other means for connecting the next adjacent electron conducting palladium sheets to the opposite pole of said circuit, whereby said intermediate electron conducting member is adapted to coact as a common electrode between two adjacent electrochemical reaction units.

2. The electrochemical reaction apparatus of claim 1 wherein said means for supplying and distributing a gaseous coreactant to said intermediate electrode includes a plurality of apertures distributed through said intermediate electrode and having passages connecting with said coreactant supply means.

3. The electrochemical reaction apparatus of claim 1 wherein said intermediate electrode is coated with a water repelling material.

4. An electrochemical reaction apparatus comprising in combination a housing, a plurality of non-porous hydrogen permeable electron conducting palladium sheets disposed in laminar spaced relation having non-conducting porous matrices disposed in spaces between electron conducting members and following the sequence: a porous electron conducting member, a non-conducting porous matrix, a non-porous hydrogen permeable electron conducting palladium sheet, a space, a non-porous hydrogen permeable electron conducting palladium sheet, a non-conducting porous matrix, a porous electron conducting member, a non-conducting porous matrix, a non-porous hydrogen permeable electron conducting palladium sheet, a space, a non-porous hydrogen permeable electron conducting palladium sheet, a non-conducting porous matrix, a porous electron conducting member, said porous electron conducting members located between any pair of hydrogen permeable electron conducting palladium sheets being adapted to coact with the porous matrix at each side to form independent reaction interfaces with each side, respectively, the next adjacent hydrogen permeable electron conducting palladium sheets on each side of said porous electron conducting member each forming an independent reaction interface with the corresponding porous matrix, respectively, the terminal porous electron conducting member coacting with the porous matrix on only one side to form an independent reaction interface therewith, means for supplying a gaseous reactant to the reaction interfaces between each of said next adjacent electron conducting members and the corresponding porous matrix, means for supplying hydrogen gas to the said spaces between pairs of adjacent hydrogen permeable palladium sheets, means for supplying and maintaining an aqueous ion-containing and conducting medium in each porous matrix, means for supplying and distributing gaseous reactant through the porous electron conducting members to one pole of an electrical circuit and other means for connecting the next adjacent hydrogen permeable electron conducting palladium sheet to the opposite pole of said circuit, whereby said porous electron conducting members are adapted to coact as a common electrode between two adjacent electrochemical reaction units.

References Cited by the Examiner

UNITED STATES PATENTS

| 409,365 | 8/89 | Mond | 136—86 |
| 2,276,188 | 3/42 | Greger | 136—86.1 |
| 2,913,511 | 11/59 | Grubb | 136—86 |
| 2,925,455 | 2/60 | Eidensohn et al. | 136—86 |
| 2,935,547 | 5/60 | Kordesch | 136—86 |
| 3,043,898 | 7/62 | Miller et al. | 136—86 |

FOREIGN PATENTS 521,773  5/30  Great Britain.

JOHN H. MACK, *Primary Examiner.*
JOHN R. SPECK, *Examiner.*